United States Patent
Heltsch

(10) Patent No.: US 11,179,903 B2
(45) Date of Patent: Nov. 23, 2021

(54) METHOD FOR MANUFACTURING OF A FIBER COMPOSITE COMPONENT

(71) Applicant: AIRBUS OPERATIONS GMBH, Hamburg (DE)

(72) Inventor: Norbert Heltsch, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 716 days.

(21) Appl. No.: 15/861,083

(22) Filed: Jan. 3, 2018

(65) Prior Publication Data

US 2018/0207890 A1    Jul. 26, 2018

(30) Foreign Application Priority Data

Jan. 20, 2017    (DE) .......................... 102017101074.2

(51) Int. Cl.
| | | |
|---|---|---|
| *B29C 70/30* | (2006.01) | |
| *B29C 70/50* | (2006.01) | |
| *B32B 3/06* | (2006.01) | |
| *B29C 70/72* | (2006.01) | |
| *B29C 31/00* | (2006.01) | |
| *B29C 70/48* | (2006.01) | |
| *B29C 70/08* | (2006.01) | |
| *B29C 31/08* | (2006.01) | |

(52) U.S. Cl.
CPC ............ *B29C 70/50* (2013.01); *B29C 31/008* (2013.01); *B29C 31/08* (2013.01); *B29C 70/081* (2013.01); *B29C 70/30* (2013.01); *B29C 70/48* (2013.01); *B29C 70/72* (2013.01); *B32B 3/06* (2013.01)

(58) Field of Classification Search
CPC ..... B29C 70/38; B29C 70/382; B29C 70/384; B29C 70/386; B29C 70/388
See application file for complete search history.

(56) References Cited

U.S. PATENT DOCUMENTS

| 8,574,211 | B2 | 11/2013 | Morita et al. |
| 9,278,484 | B2 | 3/2016 | Guzman et al. |
| 9,757,904 | B2 | 9/2017 | Ufer et al. |
| 2006/0073311 | A1* | 4/2006 | Hogg .................... B29C 70/386 428/174 |

(Continued)

FOREIGN PATENT DOCUMENTS

| CN | 101896336 A | 11/2010 |
| CN | 102555316 A | 7/2012 |

(Continued)

OTHER PUBLICATIONS

German Patent and Trademark Office, German Search Report in application No. DE102017101074.2, dated Oct. 9, 2017.

(Continued)

*Primary Examiner* — Matthew J Daniels
(74) *Attorney, Agent, or Firm* — Jenkins, Wilson, Taylor & Hunt, P.A.

(57) ABSTRACT

Disclosed is a method for manufacturing a fiber composite member. The method involves the step of producing a fiber layer by depositing at least two fiber webs in a plane adjacent to each other and along a circular guiding arc. The fiber webs are deposited on curved deposition paths that intersect the circular guiding arc with the same predetermined angle, and are formed in the form of portions of circular involutes.

14 Claims, 1 Drawing Sheet

(56) References Cited

U.S. PATENT DOCUMENTS

2009/0263618 A1* 10/2009 McCarville ............ B29C 70/38
                                                                                    428/113
2010/0285265 A1    11/2010  Shinoda et al.
2012/0076973 A1     3/2012  Guzman et al.

FOREIGN PATENT DOCUMENTS

| CN | 103402739 A | 11/2013 |
|----|-------------|---------|
| CN | 104302465 A | 1/2015 |
| CN | 105437570 A | 3/2016 |
| DE | 102016106258 A1 | 10/2016 |
| EP | 1511949 B1 | 6/2006 |

OTHER PUBLICATIONS

Chinese Office Action for Application No. 201810044173.1 dated Jan. 29, 2021.

* cited by examiner

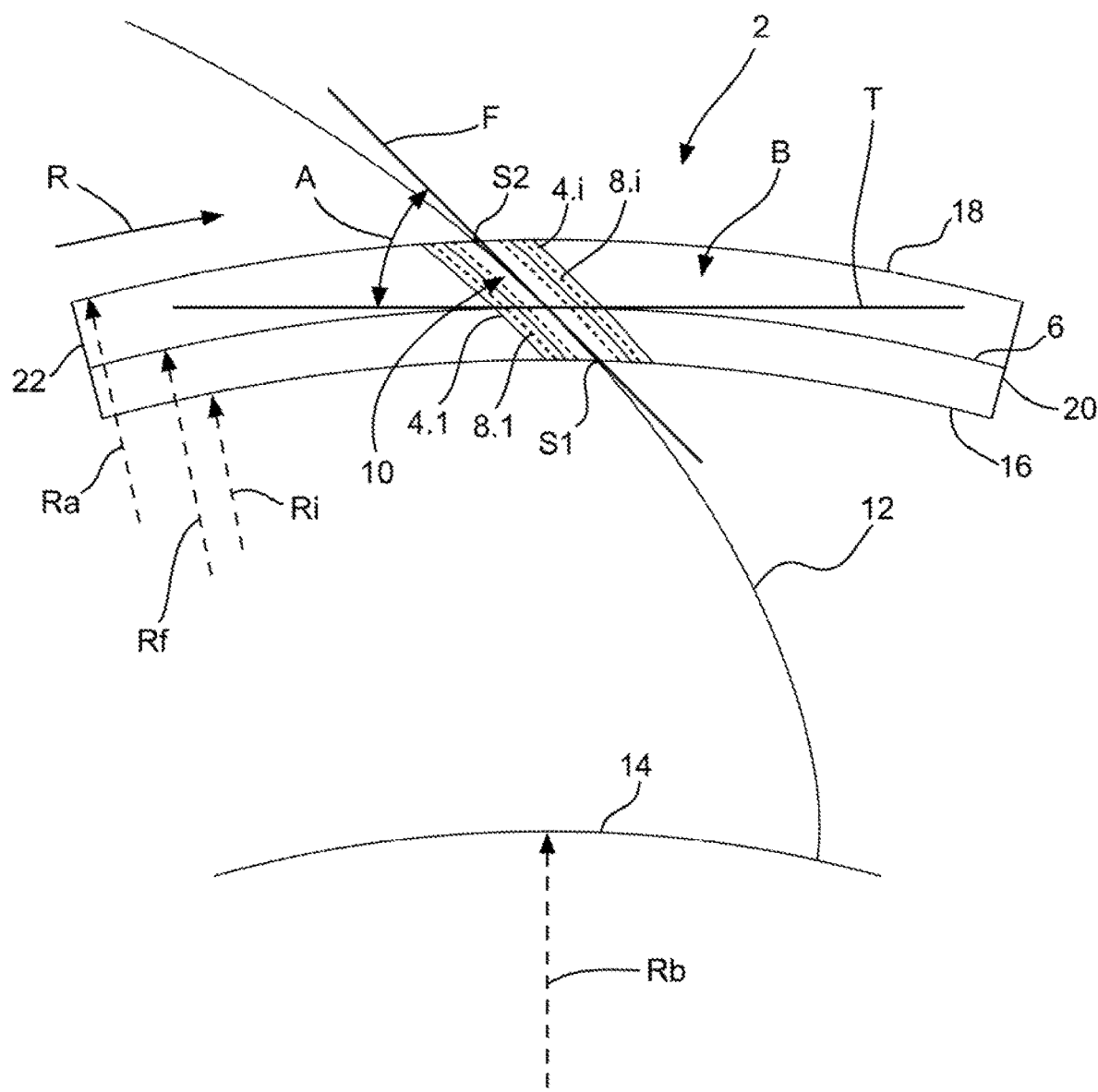

METHOD FOR MANUFACTURING OF A FIBER COMPOSITE COMPONENT

CROSS-REFERENCE TO PRIORITY APPLICATION

This application claims the benefit of, and priority to, German patent application number DE 102017101074.2, filed Jan. 20, 2017. The content of the referenced application is incorporated by reference herein.

TECHNICAL FIELD

The description relates to a method for manufacturing a fiber composite component, wherein individual fiber webs are deposited side by side to produce a fiber layer.

BACKGROUND

In the construction of aircrafts an increasing number of fiber composite components are utilized. For example, today, fuselage frames are realized as fiber composite components. Such components are usually curved and are subjected to complex manufacturing processes for achieving sufficient resistance. For manufacturing such a component, individual fiber layers are sandwiched on top of each other, wherein in turn the individual fiber layers are manufactured by depositing individual fiber webs side by side. Multiple fiber layers sandwiched on top of each other can be formed to a fiber composite component.

Though, the depositing of the fiber webs implies several difficulties. For achieving a resistance as high as possible gaps should be omitted between the individual fiber webs.

BRIEF SUMMARY

According to this background, there may be a need to provide an improved method for manufacturing of a fiber composite component with which the forgoing drawbacks can be minimized.

According to an aspect, there is provided a method for manufacturing of a fiber composite component comprising a step in which a fiber layer is produced by depositing at least two fiber webs in one level adjacent to each other and along a circular guiding arc, wherein the fiber webs are deposited onto curved deposition paths which intersect the circular guiding arc with the same predetermined angle and are defined in the form of portions of circular involutes.

With the method, it is possible to create a fiber layer in which the fiber webs are deposited substantially gap-free adjacent to each other. This allows a high resistance of the component.

According to an embodiment, the circular involutes comprise reference circles having the same radius.

According to an embodiment, the circular involutes comprise an identical reference circle.

According to an embodiment, each reference circle is concentrically defined relative to the circular guiding arc.

According to an embodiment, the fiber webs are deposited in a deposition area between an inner curve and an outer curve, wherein the inner curve at least partially radially expands within the circular guiding arc and the outer curve at least partially expands outside of the circular guiding arc and the inner curve and the outer curve do not intersect with each other. The circular guiding arc can be provided as needed between the inner curve and outer curve. For example, the circular guiding arc is arranged radially outside of the reference circle. For example, the circular guiding arc can be arranged on about half height between the inner curve and the outer curve. The circular guiding arc can be coincided with the inner curve.

According to an embodiment, the inner curve is at least partially concentric with the circular guiding arc.

According to an embodiment, the outer curve is at least partially concentric with the circular guiding arc.

According to an embodiment, the inner curve, the outer curve, the circular guiding arc, and the reference circle are concentric with each other.

According to an embodiment, the inner curve is radially arranged within the circular guiding arc.

According to an embodiment, the outer curve is radially outside arranged of the circular guiding arc.

According to an embodiment, each reference circle is arranged outside of the deposition area such that the reference circle does not contact the deposition area or only its inner curve. The reference circle is, for example, always radially located within the inner curve, so that a starting point of the fiber web is not located within the deposition area. For example, the reference circle is not situated within the deposition area. But the reference circle might contact the inner curve, however does not intersect it. This particular situation might be valid for the 90°-layers.

According to a further embodiment, the deposition area is defined like a circular ring segment, and, for example, its sides radially expand towards the center point of the circular guiding arc.

According to an embodiment, the method further comprises a step according to which at least a further plane fiber layer is produced on the fiber layer by depositing at least two fiber webs onto the fiber layer, namely, for example, according to a method described in the previous embodiments, wherein the fiber webs are deposited in an angle different to the predetermined angle.

According to a further embodiment, the fiber webs are deposited by a deposition head within a process of depositing fibers, for example an AFP- (Automated fiber placement) or DFP (Dry fiber placement)-process, wherein, according to an example, the produced fiber layers are deposited onto a positive core, for example a C-profile, and subsequently are cured. In another example, the fiber layers including or consisting of fiber webs are deposited onto a plane tool, as for example a plate, i.e. a steel plate. The fiber layers, which are viscous-adhesively bonded together on top of each other, also called preform, may then be reshaped by a positive core into a curved bending support, i.e. into a C-profile.

According to a further aspect there is provided a fiber composite component, for example, a door casing frame of an aircraft, having at least one fiber layer comprising at least two fiber webs, which are deposited in one plane adjacent to each other which are deposited along curved deposition paths defined in form of sections of parallel circular involutes.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 is a schematic illustration for describing of a method for manufacturing of a fiber composite component.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The illustrations in the drawing are schematic and not to scale.

If in the following description of embodiments similar reference signs are used in different drawings, these indicate equal or similar elements. However, equal or similar elements may be indicated by different reference signs.

FIG. 1 is a schematic illustration for describing a method for manufacturing of a fiber composite component according to an embodiment. In the method, a fiber layer 2 is produced in a deposition area B by depositing multiple fiber webs 4.1, . . . , 4.i in a plane, in a direction R adjacent to each other along a guiding curve 6. The guiding curve 6 may be provided in that the neutral fiber of the finished fiber composite component coincides with the guiding curve 6. Thus, the guiding curve 6 can be also indicated as neutral fiber. Herein, also other embodiments are conceivable.

The deposition area B of this embodiment is a ring-segment-like, plane area, which is defined by an outer curve 18 and an inner curve 16 as well as two sides 20, 22. In this embodiment, the outer curve 18 and the inner curve 16 are concentrically defined to each other. Herein, also other formations are conceivable. The outer curve 18 comprises a radius Ra and the inner curve 16 comprises a radius Ri. However, this does not necessarily have to be the case. It would be also possible to use a differently shaped outer curve and/or a differently shaped inner curve. The deposition area could be defined for example by a plane tool, i.e. a plate, and a carrier plate, respectively, for example a steal- or aluminum plate. In other words, the fiber webs of the lowest layer can be deposited on a carrier plate. Onto this carrier plate multiple fiber layers 2 can be stacked one on top of the other to define a stack of fiber layers. The finished stack of fiber layers can then be removed from the carrier plate for further processing.

As apparent from FIG. 1, the fiber webs 4.1, . . . , 4.i are deposited side by side along the circular guiding arcs 6. In the embodiment shown, the circular guiding arc 6 is provided between the inner curve 16 and outer curve 18. The circular guiding arc 6 is arranged concentrically to the inner curve 16 and outer curve 18. Furthermore, the circular guiding arc 6 has a radius Rf which is greater than the radius Ri and smaller than the radius Ra. Herein, however, different formations are conceivable.

As is further apparent from FIG. 1, the fiber webs 4.1, . . . , 4.i are deposited side by side along deposition paths 8.1, . . . , 8.i. These deposition paths 8.1, . . . , 8.i intersect the circular guiding arc at the same predetermined angle A. The angle A is shown in FIG. 1 as an angle between a tangent T on the circular guiding arc 6 and a tangent F on the deposition path 8.1, . . . , 8.i at the intersection of the deposition path 8.1, . . . , 8.i with the guiding circle 6. In the embodiment shown, the angle A amounts 45°. Thus, the fiber layer 2, shown in FIG. 1, is also referred to as 45°-layer. Herein, however, different angles A are conceivable. For example, the angle A can amount 90°.

According to an aspect, the deposition paths 8.1, . . . , 8.i are portions 10 of circular involutes 12 of a reference circle 14. In the embodiment, the reference circle 14 is arranged concentric with the circular guiding arc 6 and has a radius Rb which is smaller than the radii Ra, Ri and Rf. The beginning and the end of the deposition paths are indicated in FIG. 1 by the points S1 and S2. These points correspond to points of intersection of the circle involute 12 with the inner curve 16 and the outer curve 18 of the deposition area B. The individual deposition paths 8.1, . . . , 8.i of this embodiment are therefore curved so that the fiber webs are deposited in a curved manner. Since the deposition paths correspond to portions 10 of the circular involutes 12, it is possible to deposit the individual fiber webs in such a way that substantially no gap occurs between adjacent webs. As a result, a fiber composite component with uniform strength can be manufactured.

For depositing, use is made of a computer-controlled deposition head (not shown) which deposits a fibrous web or simultaneously multiple fiber webs. This deposition head is provided with the above described geometrical data so that it can determine a deposition path and then deposit the individual fiber webs parallel to a course. As a result, it is possible by consideration of the width of the fiber to enable the deposition head to deposit the fiber webs gap-free side by side.

In the context of the present embodiment, the reference circle 14 is arranged radially inside the deposition area B in such a way that the reference circle 14 does not contact the deposition area B. Thus, the reference circle lies radially inside the inner curve 16, and, thus not in the deposition area B. However, the reference circle can also contact the inner curve. This particular situation can be in particularly present in the so-called 90° layers in which the deposition path intersects the inner curve 16 with an angle of 90°.

In the following, a numerical example is provided including mathematical formulas for determining the individual parameters for a 45° fiber layer 2. In this example the circular guiding arc 6, the inner curve 16, the outer curve 18 and the reference circle 14 are arranged concentrically to each other.

| | |
|---|---|
| Angle (A) | A := 45° |
| Circular guiding arc (Rf) | Rf := 2950 mm |
| Inner curve (Ri) | Ri := 2850 mm |
| Outer curve (Ra) | Ra := 3050 mm |
| (6, 16, 18) center point | xc_R: 0.00000001 mm |
| | yc_R := 0 mm |

-continued

| | |
|---|---|
| Tangent angle at the intersection with neutral fiber | $t\_m := \tan\left(\frac{\pi}{2} - A\right)$ |
| | $t\_m = 57.2960°$ |
| Position vector | $\varphi(t) := t - \mathrm{atan}(t)$ |
| | $\varphi(t\_m) = 12.296 \text{ deg}$ |
| Reference circle (Rb) | $Rb := \dfrac{Rf}{\sqrt{1 + t\_m^2}}$ |
| | $Rb = 2.086 \text{ m}$ |
| ri(t) := | $\sqrt{xc\_R^2 + yc\_R^2} \cdot \cos\left(\mathrm{atan}\left(\dfrac{yc\_R}{xc\_R}\right) - \varphi(t)\right) + \sqrt{Ri^2 - \left(\sqrt{xc\_R^2 + yc\_R^2} \cdot \sin\left(\mathrm{atan}\left(\dfrac{yc\_R}{xc\_R} - \varphi(t)\right)\right)\right)^2}$ |
| Inner curve (16) | $xi\_r(t) := ri(t) \cdot \cos\varphi(t)$ |
| | $yi\_r(t) := ri(t) \cdot \sin\varphi(t)$ |
| ra(t) := | $\sqrt{xc\_R^2 + yc\_R^2} \cdot \cos\left(\mathrm{atan}\left(\dfrac{yc\_R}{xc\_R}\right) - \varphi(t)\right) + \sqrt{Ra^2 - \left(\sqrt{xc\_R^2 + yc\_R^2} \cdot \sin\left(\mathrm{atan}\left(\dfrac{yc\_R}{xc\_R} - \varphi(t)\right)\right)\right)^2}$ |
| Outer curve (18) | $xa\_r(t) := ra(t) \cdot \cos(\varphi(t))$ |
| | $ya\_r(t) := ra(t) \cdot \sin(\varphi(t))$ |
| Circular guiding arc (6) | $xf(t) := Rf \cdot \cos(\varphi(t) - \varphi(t\_m))$ |
| | $yf(t) := Rf \cdot \sin(\varphi(t) - \varphi(t\_m))$ |
| Reference circle (14) | $xb(t) := Rb \cdot \cos(\varphi(t) - \varphi(t\_m))$ |
| | $yb(t) := Rb \cdot \sin(\varphi(t) - \varphi(t\_m))$ |
| Involute portion (10) | $x(t) := Rb \cdot (\cos(t) + t \cdot \sin(t))$ |
| Circular involute (12) | $y(t) := Rb \cdot (\sin(t) - t \cdot \cos(t))$ |
| Fiber angle in the intersection with inner and outer curves | |
| $A\_inner := \pi/2 - \mathrm{atan}(t\_inner)$ | $A\_inner = 47.047 \cdot \text{deg}$ |
| $A\_outer := \pi/2 - \mathrm{atan}(t\_outer)$ | $A\_outer = 43.151 \cdot \text{deg}$ |
| Fiber angle deviations in the intersection with inner and outer curves | |
| $dA\_inner =: A\_inner - A$ | $dA\_inner = 2.047 \cdot \text{deg}$ |
| $dA\_outer =: A\_outer - A$ | $dA\_outer = -1.849 \cdot \text{deg}$ |

In the following, a numerical example including mathematical formulas for determining the individual parameters for a 90° fiber layer 2 is provided, wherein the circular guiding arc 6, the inner curve 16, the outer curve 18 and the reference circle 14 are also concentric to each other.

| | |
|---|---|
| Angle (A) | $A := 90°$ |
| Circular guiding arc (Rf) | $Rf := 2850 \text{ mm}$ |
| Inner curve (Ri) | $Ri := 2850 \text{ mm}$ |
| Outer curve (Ra) | $Ra := 3050 \text{ mm}$ |
| (6, 16, 18) center point | $xc\_R: 0.00000001 \text{ mm}$ |
| | $yc\_R := 0 \text{ mm}$ |
| Tangent angle at the intersection with neutral fiber | $t\_m := \tan(\pi/2 - A)$ |
| | $t\_m = 0°$ |
| Position vector | $\varphi(t) := t - \mathrm{atan}(t)$ |
| | $\varphi(t\_m) = 0 \text{ deg}$ |
| Reference circle (Rb) | $Rb := \dfrac{Rf}{\sqrt{1 + t_{m^2}}}$ |
| | $Rb = 2.85 \text{ m}$ |
| ri(t) := | $\sqrt{xc\_R^2 + yc\_R^2} \cdot \cos\left(\mathrm{atan}\left(\dfrac{yc\_R}{xc\_R}\right) - \varphi(t)\right) + \sqrt{Ri^2 - \left(\sqrt{xc\_R^2 + yc\_R^2} \cdot \sin\left(\mathrm{atan}\left(\dfrac{yc\_R}{xc\_R} - \varphi(t)\right)\right)\right)^2}$ |

| | |
|---|---|
| Inner curve (16) | $xi\_r(t) := ri(t) \cdot \cos\phi(t))$ |
| | $yi\_r(t) := ri(t) \cdot \sin\phi(t))$ |
| $ra(t) :=$ | $\sqrt{xc\_R^2 + yc\_R^2} \cdot \cos\left(\operatorname{atan}\left(\frac{yc\_R}{xc\_R} - \varphi(t)\right)\right) +$ $\sqrt{Ra^2 - \left(\sqrt{xc\_R^2 + yc\_R^2} \cdot \sin\left(\operatorname{atan}\left(\frac{yc\_R}{xc\_R} - \varphi(t)\right)\right)\right)^2}$ |
| Outer curve (18) | $xa\_r(t) := ra(t) \cdot \cos(\phi(t))$ |
| | $ya\_r(t) := ra(t) \cdot \sin(\phi(t))$ |
| Circular guiding arc (6) | $xf(t) := Rf \cdot \cos(\phi(t) - \phi(t\_m))$ |
| | $yf(t) := Rf \cdot \sin(\phi(t) - \phi(t\_m))$ |
| Reference circle (14) | $xb(t) := Rb \cdot \cos(\phi(t) - \phi(t\_m))$ |
| | $yb(t) := Rb \cdot \sin(\phi(t) - \phi(t\_m))$ |
| Involute portion (10) | $x(t) := Rb \cdot (\cos(t) + t \cdot \sin(t))$ |
| Circular involute (12) | $y(t) := Rb \cdot (\sin(t) - t \cdot \cos(t))$ |
| Fiber angle in the intersection with inner and outer curves | |
| $A\_inner := \pi/2 - \operatorname{atan}(t\_inner)$ | $A\_inner = 90 \cdot \deg$ |
| $A\_outer := \pi/2 - \operatorname{atan}(t\_outer)$ | $A\_outer = 69.136 \cdot \deg$ |
| Fiber angle deviations in the intersection with inner and outer curves | |
| $dA\_inner =: A\_inner - A$ | $dA\_inner = -0 \cdot \deg$ |
| $dA\_outer =: A\_outer - A$ | $dA\_outer = -20.864 \cdot \deg$ |

According to a further embodiment, the circular guiding arc 6 having a radius Rf can be eccentrically arranged to the inner curve 16, the outer curve 18 and the reference circle 14. In the following, a numerical example is provided including mathematical formulas for determining the individual parameters for a 45° fiber layer with eccentric circular guiding arc 6.

| | |
|---|---|
| Angle (A) | $A := 45°$ |
| Circular guiding arc (Rf) | $Rf := 2950$ mm |
| Inner curve (Ri) | $Ri := 2850$ mm |
| Outer curve (Ra) | $Ra := 3050$ mm |
| (6, 16, 18) center point | $xc\_R: 50$ mm |
| | $yc\_R = 100$ mm |
| Fiber angle in the intersection with inner and outer curves | |
| $A\_inner := \pi/2 - \operatorname{atan}(t\_inner)$ | $A\_inner = 45.635 \cdot \deg$ |
| $A\_outer := \pi/2 - \operatorname{atan}(t\_outer)$ | $A\_outer = 41.889 \cdot \deg$ |
| Fiber angle deviations in the intersection with inner and outer curves | |
| $dA\_inner =: A\_inner - A$ | $dA\_inner = 0.635 \cdot \deg$ |
| $dA\_outer =: A\_outer - A$ | $dA\_outer = -3.111 \cdot \deg$ |

According to a further embodiment, the circular guiding arc having a radius Rf may be eccentrically arranged to the inner curve 16, the outer curve 18 and the reference circle 14. In the following a numerical example is provided including mathematical formulas for determining the individual parameters for a 90° fiber layer with eccentric circular guiding arc 6.

| | |
|---|---|
| Angle (A) | $A := 90°$ |
| Circular guiding arc (Rf) | $Rf := 2850$ mm |
| Inner curve (Ri) | $Ri := 2850$ mm |
| Outer curve (Ra) | $Ra := 3050$ mm |
| (6, 16, 18) center point | $xc\_R: 50$ mm |
| | $yc\_R = 250$ mm |
| Fiber angle in the intersection with inner and outer curves | |
| $A\_inner := \pi/2 - \operatorname{atan}(t\_inner)$ | $A\_inner = 80.527 \cdot \deg$ |
| $A\_outer := \pi/2 - \operatorname{atan}(t\_outer)$ | $A\_outer = 67.024 \cdot \deg$ |
| Fiber angle deviations in the intersection with inner and outer curves | |
| $dA\_inner =: A\_inner - A$ | $dA\_inner = -9.473 \cdot \deg$ |
| $dA\_outer =: A\_outer - A$ | $dA\_outer = -22.976 \cdot \deg$ |

In addition, it should be noted that "comprising" does not exclude other elements or steps, and "a" or "an" does not exclude a plurality. It should also be appreciated that features or steps described with reference to one of the above embodiments may also be used in combination with other features or steps of other embodiments described above.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for manufacturing of a fiber composite component, the method comprising:
producing a fiber layer by depositing at least two fiber webs in one level adjacent to each other and along a circular guiding arc, wherein the fiber webs are deposited onto curved deposition paths which intersect the circular guiding arc with the same predetermined angle and which are defined in the form of portions of circular involutes of one or more reference circle arranged concentric with the circular guiding arc and having a radius that is smaller than a radius of the circular guiding arc such that substantially no gap occurs between adjacent webs.

2. The method of claim 1, wherein the reference circles have the same radius.

3. The method of claim 2, wherein the one or more reference circle comprises an identical reference circle.

4. The method of claim 1, wherein the fiber webs are deposited in a deposition area between an inner curve and an outer curve, wherein the inner curve at least partially radially expands within the circular guiding arc and the outer curve at least partially expands outside of the circular guiding arc and the inner curve and the outer curve do not intersect with each other.

5. The method of claim 4, wherein the inner curve is at least partially concentric with the circular guiding arc.

6. The method of claim 4, wherein the outer curve is at least partially concentric with the circular guiding arc.

7. The method of claim 4, wherein the inner curve, the outer curve, the circular guiding arc, and the reference circle are concentric with each other.

8. The method of claim 4, wherein the inner curve is radially arranged within the circular guiding arc.

9. The method of claim 4, wherein the outer curve is radially outside arranged of the circular guiding arc.

10. The method of claim 4, wherein each reference circle is arranged outside of the disposition area such that the reference circle does not contact the deposition area or only its inner curve.

11. The method of claim 4, wherein the deposition area comprises a circular ring segment, and sides of the deposition area radially expand towards the center point of the circular guiding arc.

12. The method of claim 1, further comprising:
producing at least a further plane fiber layer on the fiber layer by depositing at least two fiber webs onto the fiber layer, wherein the fiber webs are deposited in an angle different to the predetermined angle.

13. The method of claim 1, wherein the fiber webs are deposited by a deposition head within a process of depositing fibers, wherein the produced fiber layers are deposited onto a positive core, and subsequently are cured.

14. The method of claim 13, wherein the fiber webs are deposited within one of the group of an automated fiber placement process and a dry fiber placement process.

* * * * *